United States Patent

Kirby

(10) Patent No.: US 8,516,827 B2
(45) Date of Patent: Aug. 27, 2013

(54) AEROENGINE BLEED VALVE

(75) Inventor: Stuart J. Kirby, Derby (GB)

(73) Assignee: Rolls-Royce PLC, London (GB)

( * ) Notice: Subject to any disclaimer, the term of this patent is extended or adjusted under 35 U.S.C. 154(b) by 1172 days.

(21) Appl. No.: 12/314,816

(22) Filed: Dec. 17, 2008

(65) Prior Publication Data

US 2009/0188257 A1 Jul. 30, 2009

(30) Foreign Application Priority Data

Jan. 25, 2008 (GB) .................... 0801301.3

(51) Int. Cl.
*F02C 9/18* (2006.01)

(52) U.S. Cl.
USPC ........... 60/782; 60/226.1; 138/40; 239/602; 415/144

(58) Field of Classification Search
USPC .......... 138/40; 415/144, 116, 117; 60/226.1, 60/782, 785; 239/590, 602, 8
See application file for complete search history.

(56) References Cited

U.S. PATENT DOCUMENTS

| | | | |
|---|---|---|---|
| 3,909,152 A | 9/1975 | Rannenberg | |
| 6,098,896 A * | 8/2000 | Haruch | 239/8 |
| 6,487,848 B2 * | 12/2002 | Zysman et al. | 60/262 |
| 6,701,715 B2 * | 3/2004 | Anderson et al. | 60/782 |
| 7,946,104 B2 * | 5/2011 | Frank et al. | 60/226.1 |
| 2003/0205049 A1 | 11/2003 | Anderson et al. | |
| 2006/0266051 A1 | 11/2006 | Gukeisen et al. | |
| 2007/0210186 A1 * | 9/2007 | Fenton et al. | 239/422 |
| 2007/0256420 A1 | 11/2007 | Schott et al. | |
| 2012/0137704 A1 | 6/2012 | Schott et al. | |

FOREIGN PATENT DOCUMENTS

| | | |
|---|---|---|
| DE | 103 52 252 A1 | 7/2005 |
| EP | 1 106 786 A3 | 6/2001 |
| EP | 1 300 567 A3 | 4/2003 |
| EP | 1 728 992 A2 | 12/2006 |
| EP | 1 852 614 A2 | 11/2007 |
| EP | 1 854 989 A2 | 11/2007 |
| EP | 1 881 161 A2 | 1/2008 |
| GB | 2 132 269 A | 7/1984 |
| WO | WO 2006/091142 A1 | 8/2006 |

OTHER PUBLICATIONS

"The Jet Engine," 5th Edition, 1986, pp. 28-32, Rolls-Royce, plc.
Oct. 19, 2012 Search Report issued in European Patent Application No. 08254021.

* cited by examiner

*Primary Examiner* — William H Rodriguez
*Assistant Examiner* — Steven Sutherland
(74) *Attorney, Agent, or Firm* — Oliff & Berridge, PLC

(57) ABSTRACT

A bleed valve bleeds hot gases from a compressor into a bypass duct of a gas turbine engine. The valve comprises a diffuser having opposing walls and a divider located between the walls and which define at least two passages through which a bleed fluid flows and into a fluid flow through the bypass duct. The passages are angled towards each other to force the two gas flows together to form a high aspect ratio plume. This plume has a relatively large surface area that that improves mixing with the bypass flow to cool it and prevented otherwise hot bleed flows from impinging on heat sensitive components adjacent the bypass duct.

19 Claims, 4 Drawing Sheets

AEROENGINE BLEED VALVE

The present invention relates to a bleed valve assembly for a gas turbine engine and particularly but not exclusively for releasing compressed air from a compressor into a bypass duct of the engine.

The use and configuration of bleed valves are well known in gas turbine engines and are usually used to improve engine operability particularly for the engine's compressors. In use heated air at high pressure passes from a compressor, through a bleed valve and via a diffuser into a main gas stream. The compressor may be either an intermediate or high pressure compressor with temperatures of exhausted gas may be up to 400° C. The diffuser is usually a domed plate comprising an array of holes to enhance mixing with the main gas stream, which is usually a cooler bypass flow.

Known bleed valve diffusers, such as installed on the Trent® 500 aeroengine of Rolls-Royce™ plc, are designed with the intent to a) attenuate noise produced within the bleed valve; b) produce small separate jets of bleed air (rather than one large one) to increase the jets noise frequency, which is better attenuated within the bypass duct and atmosphere; and c) improve mixing of the hot gases flowing through the bleed valve with the cold bypass flow in order to limit/prevent thermal damage to nacelle and other components.

These diffusers are usually circular domes and have an array of holes where each hole is angled radially so that its air flow jet has both radial and axial velocity components relative to the diffuser's centre-line. Some diffusers, like the Trent® 500's, have a number of zones of holes where each zone's holes have different axial angles to the centre-line. Each of these diffusers attempts to spread the flow by pointing each hole (or group of holes) in different directions. This is intended to enhance the mixing of the hot gas passing through the diffuser with the cool bypass flow to reduce its temperature before impinging on thermally sensitive nacelle and/or engine parts. However, it has been found that these prior art diffusers are ineffective because the individual flows from each small hole do not act independently. Although each small gas stream is initially discrete and is directed in a slightly different direction, within a short distance they conglomerate into a single plume. This is because the bypass flow is unable to achieve significant penetration into the mass of individual plumes and so a partial vacuum forms between them. This vacuum causes the plumes to turn until they are pointing in the same direction and thus forms a single plume entity.

Increasing the number of bleed valve assemblies could improve mixing overall, however, this adds significant weight, cost and takes up more space.

Therefore it is an object of the present invention to provide a diffuser for a bleed valve arranged to improve mixing between hot gases passing therethrough and a main air flow it is vented into.

In accordance with the present invention a bleed valve for a gas turbine engine, the valve comprises a diffuser having opposing walls and a divider located between the walls and which define at least two passages through which a bleed fluid flows and into a fluid flow, the diffuser is characterised in that the passages are angled towards each other to form a high aspect ratio plume.

Preferably, the angled is about 20 degrees and should be at least 5 degrees, but it may be up to 60 degrees.

Preferably, the at least two passages each terminate in an elongate slot. The elongate slots have a main axis which may be orientated within 30 degrees of the direction of the fluid flow. Preferably, however, the main axis is approximately parallel to the direction of the fluid flow although the main axis could be perpendicular to the direction of the fluid flow.

Alternatively, the opposing walls are curved towards each other to help turn the two gas flows towards each other.

Additionally, the passages are further defined by another pair of opposing walls, which preferably diverge from one another.

However, preferably the overall cross-sectional area of the passage converges. Alternatively, the overall cross-sectional area of the passage diverges.

Optionally, at least one of the opposing walls comprises an outlet edge having a serrated profile for creating vortices in the plume. Preferably, the serrations are triangular, but may be formed from a series of shapes from the group comprising rectangles, trapezoids, rhomboids, and semi-circles. The serrations may be angled into the flow through the passage.

Optionally, the divider defines a third passage.

Preferably, the divider comprises a tapering portion ending in a sharp edge. Alternatively, the divider comprises a rounded edge.

The present invention will be more fully described by way of example with reference to the accompanying drawings in which.

Figure 1:
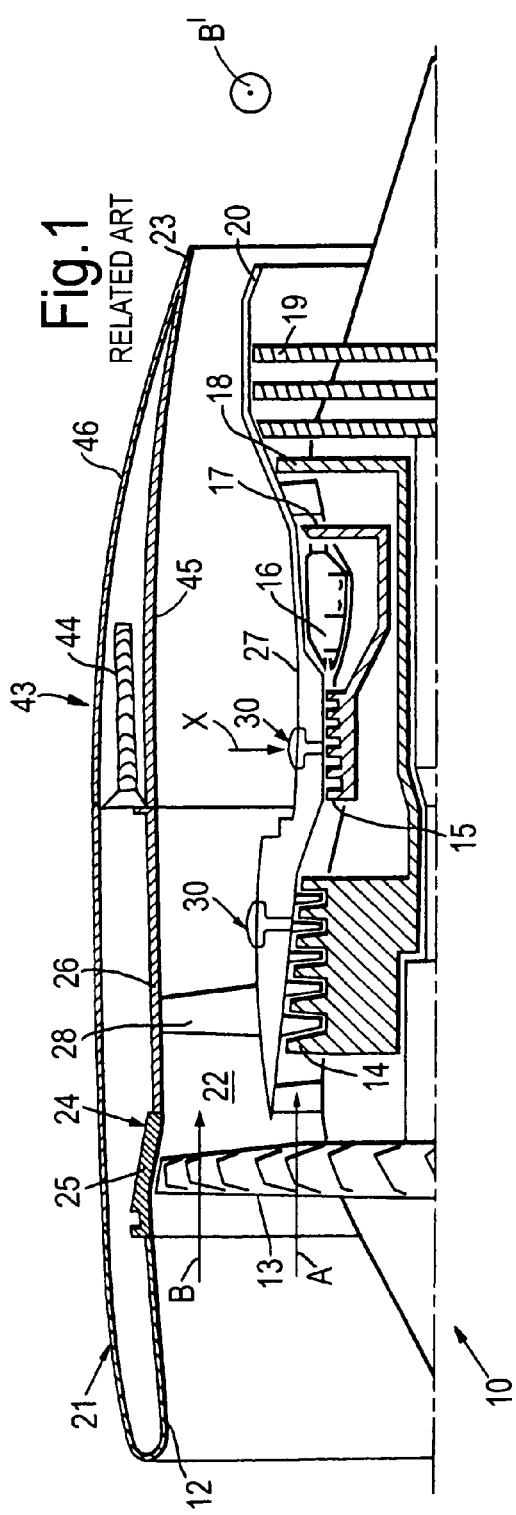
FIG. 1 is a schematic section of part of a ducted fan gas turbine engine and showing a typical location of bleed valves.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached rearwardly thereto is a rear fan casing 26.

The nacelle 21 comprises a thrust reverser unit 43 having a cascade structure 44 and bypass blocker doors (not shown) located in an outer wall 45 of the bypass duct 22. The nacelle 21 comprises a rear translatable portion 46. The thrust reverser unit 43 operates in a conventional manner so that when the rear portion of the nacelle is translated rearward, the blocker doors block the bypass flow diverting through the now exposed cascade 44. The thrust reverser unit 43 and rear portion of the nacelle 46 comprise relatively lightweight materials which are not particularly heat resistant. It should be appreciated that other well known thrust reverser mechanisms could be equally used.

During engine operations and particularly when changing rotational speed at low power it is important to ensure that the pressure ratio across each compressor 14, 15 remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described in "The Jet Engine" $5^{th}$ Edition, 1986, Rolls-Royce™ plc, pages 28-32, and details of such operation will therefore only be briefly mentioned herein.

Figure 2:
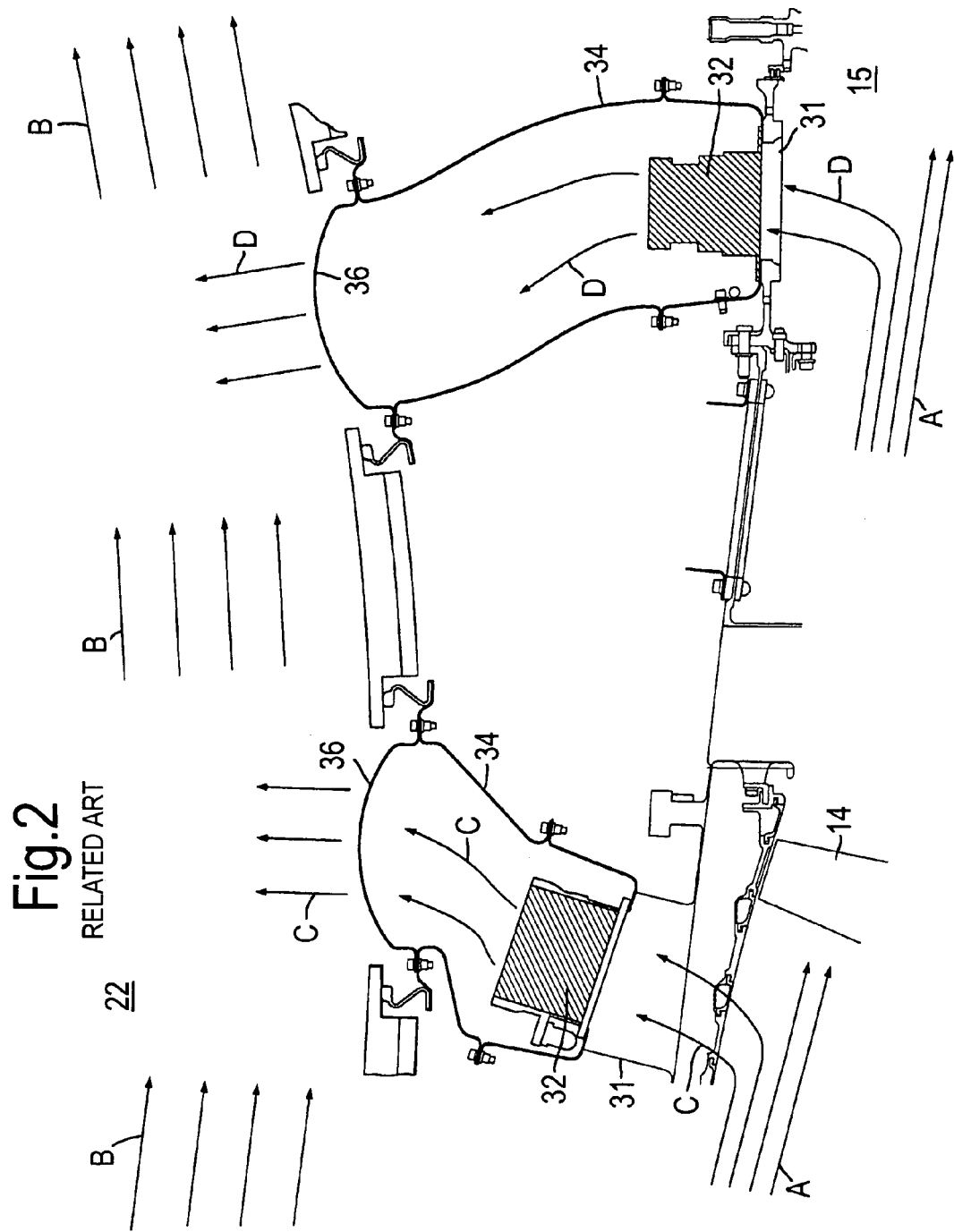
FIG. 2 is a section through part of a gas turbine engine showing a typical bleed valve assembly.

Briefly FIG. 2 shows bleed assemblies 30 associated with the intermediate pressure compressor 14 and high pressure compressor 15. Each bleed assembly 30 comprises an inlet 31 and a bleed valve 32, a duct 34 and a diffuser 36. Parts of core engine airflow A, airflows C and D, may be diverted through the IP and HP bleed assemblies 30, such that each airflow C, D enters the inlet 31, passes through the bleed valve 32 and is channelled by the duct 34 to the diffuser 36. Airflows C and D are then exhausted into the bypass duct 22 where they mix with bypass airflow B as hereinbefore described. There is usually an annular array of bleed valves around the core engine's casing 27.

Figure 4:
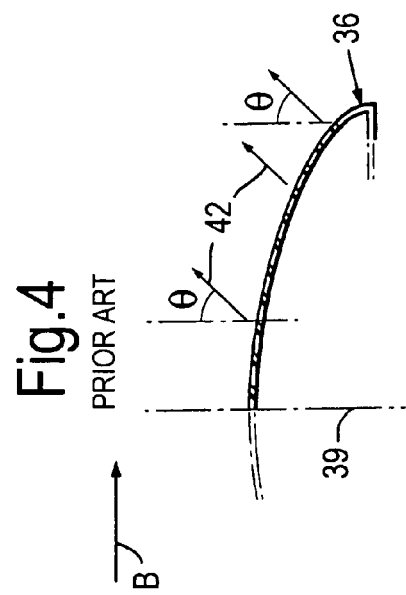
FIG. 4 is a part section through the prior art bleed valve in FIG. 4.
Figure 3:
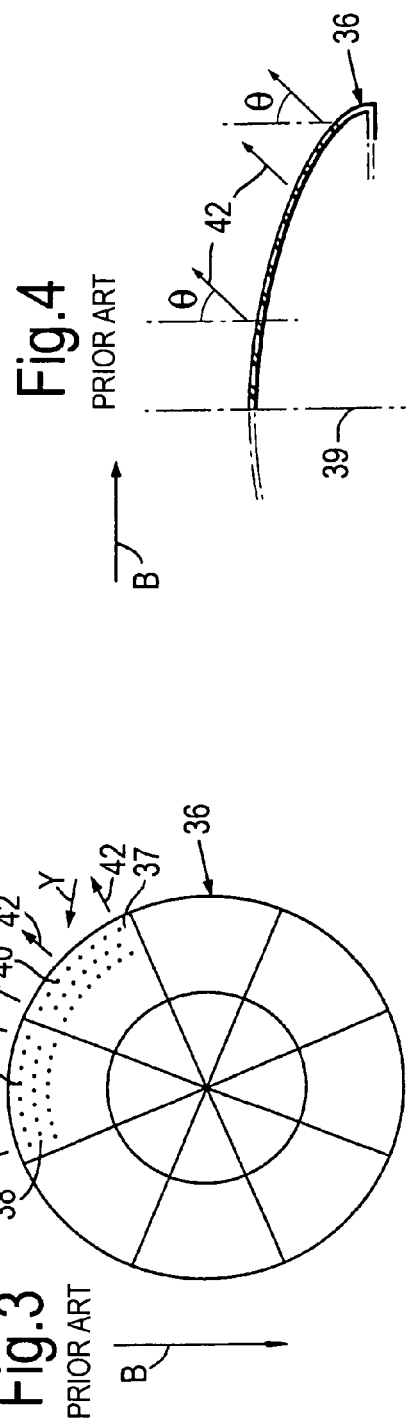
FIG. 3 is a plan view of a prior art bleed valve.

FIGS. 3 and 4 show a prior art diffuser 36 as described in the preamble. The diffuser 36 comprises a plurality of holes 40. Each hole 40 is radially aligned with respect to a centre-line 39 of the diffuser 36 i.e. a centre-line passing through each hole 40 would intersect the centre-line 39. This diffuser 36 comprises a number of zones, two of which are shown 37, 38, and each has an array of holes 40. Within each zone 37, 38 the holes 40 are also angled θ away from the centre-line 39. The angle θ may be between 5 and 65 degrees. It should be well noted, however, that all holes 40 are radially aligned from the centre-line, see arrows 42 indicating the individual radial plumes from each hole 40.

As mentioned in the preamble, it has been found that even these prior art diffusers 36 are not effective at mixing the hot bleed air with the cool bypass air because the individual flows 42 from each small hole 40 do not act independently as desired. Although each small gas stream or jet 42 is initially discrete and is directed in a slightly different direction, within a short distance they conglomerate into a single plume. This is because the main bypass flow B is unable to achieve significant penetration into the mass of individual plumes 42 and so a partial vacuum forms between them. This vacuum causes the individual plumes to turn until they are pointing in the same direction and thus forms a single plume entity, which is less easily mixed with the bypass flow B.

It is known that these prior art diffusers can cause thermal damage to the nacelle 21, the thrust reverser unit 43 and other components and it is therefore an object of the present invention to provide a diffuser arrangement that improves mixing of the bleed gases with the bypass flow B.

Figure 5A:
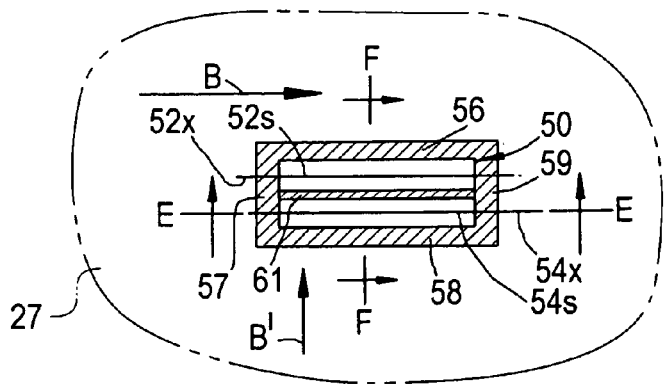
FIG. 5a is a plan view in the direction of arrow X in FIG. 1 of a diffuser of a bleed valve in accordance with the present invention.
Figure 5B:
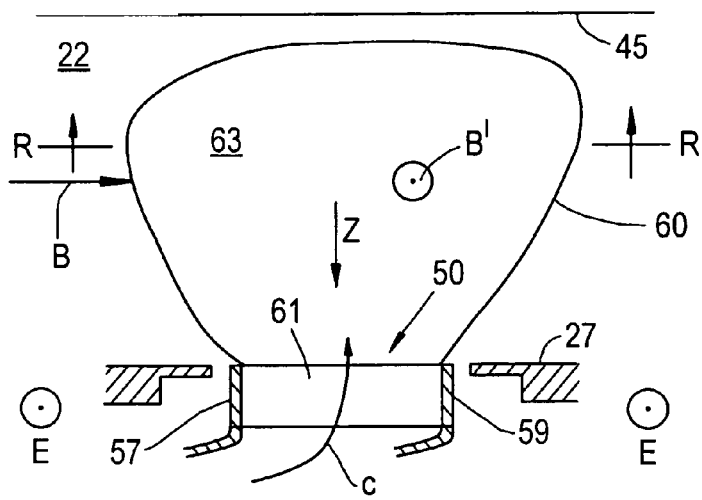
FIG. 5b is a section EE in FIG. 5a through the bleed valve in accordance with the present invention.
Figure 5C:
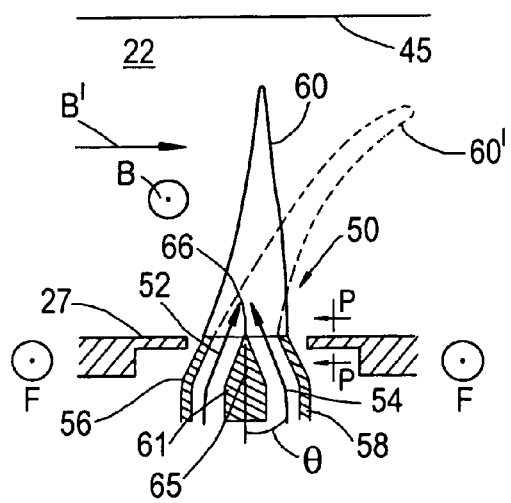
FIG. 5c is a section FF in FIG. 5a through the bleed valve in accordance with the present invention.

Referring now to the present invention shown in FIGS. 5a, 5b and 5c, a bleed valve 30 comprises a diffuser 50 having two passages 52, 54 through which bleed fluid C or D flows and into the fluid stream B passing through the bypass duct 22. The passages 52, 54 are defined between the diffuser's walls 56, 57, 58, 59 and a divider 61. Importantly, the passages 52, 54 are angled towards each other such that their respective gas flows 52C and 54C coalesce to form a single plume 60. As the two gas flows 52C and 54C merge they create turbulence that enables the bypass flow B to mix therewith more effectively than the prior art diffusers. By forcing the two gas flows 52C and 54C together the plume 60 has a relatively high aspect ratio providing a large surface area for the bypass flow to interact with.

It should be noted that a plume issuing from a single passage or a prior art diffuser is not forced to spread out to form a high aspect ratio plume 60 in accordance with the present invention. Forcing the two gas flows 52C and 54C together creates internal pressure causing it to form a high aspect ratio plume with a greater surface area for mixing than a generally circular or tube-like plume generated by the prior art diffusers.

The passages 52, 54 preferably terminate as elongate slots 52s, 54s to further promote a high aspect ratio plume 60. The slots 52s, 54s are arranged with their main axes 52x, 54x, in this exemplary embodiment, generally parallel to one another and generally parallel to the flow B. It should be borne in mind that for different engines 10, the flow B may be flowing in a direction that is substantially axial (as shown) or it may have a tangential component caused by local geometry or other airflow characteristics. Thus the preferred orientation of the main axis 52x, 54x of the slots 52s, 54s is approximately parallel to the gas flow B. Generally, it is desirable for the axes of the slots 52x, 54x to be within an angle of 30 degrees to the direction of flow B.

Nonetheless, the present invention is also advantageous where the slots 52s, 54s are orientated with their main axis 52x, 54x generally perpendicular to the bypass flow. B' represents the axis perpendicular to bypass flow B on FIGS. 5-10. Here the bypass flow B' impinges, generally perpendicularly, on a main surface 63 of the plume 60 and causes the plume to be pushed downstream as shown by plume 60'. This arrangement is advantageous as the curved path of the plume 60 subtends a greater distance for mixing with the bypass flow B' before potentially impinging upon the outer wall 45 of the bypass duct 22.

With respect to the orientation of the main axis 52x, 54x of the slots 52s, 54s, the term 'generally' or 'approximately' perpendicular or parallel to the bypass flow B, B', is intended to mean within ±5 degrees thereof.

Figure 6:
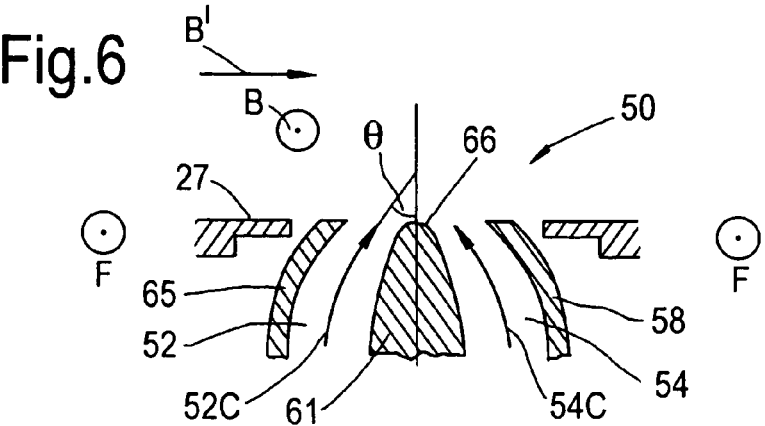
FIG. 6 is a section FF in FIG. 5c through the bleed valve showing an alternative embodiment of the present invention.

FIG. 6 shows an alternative embodiment of the present invention and is the same view as FIG. 5c. The passages 52, 54 are now curved towards each other to help turn the two gas flows 52C, 54C towards each other and promote a thinner and wider plume. Furthermore, each passageway 52, 54 is convergent towards the slot outlets. This convergence helps to create a thinner plume 60.

Figure 7:
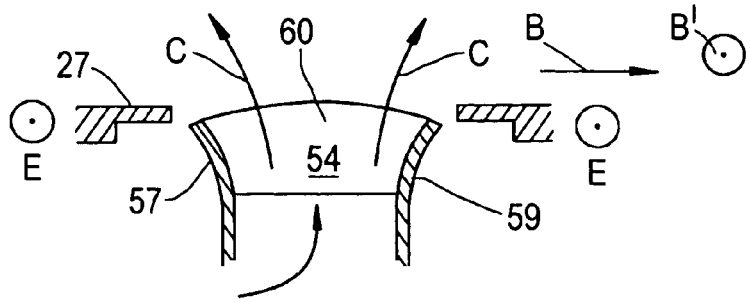
FIG. 7 is a section EE in FIG. 5b through an alternative embodiment of the bleed valve in accordance with the present invention.

FIG. 7 shows an alternative embodiment of the present invention and is a similar view as FIG. 5b. The passages 52, 54 are now divergent with the walls 57, 59 flared outwardly away from each other. This divergence helps to spread the two gas flows 52C, 54C creating a wider plume 60 as seen on FIG. 5b.

In addition, it is possible to combine the FIG. 7 embodiment with that of FIG. 6, such that the passages 52, 54 diverge in their axial direction (i.e. along axes 52x, 54x) and converge in the orthogonal direction. Overall the cross-sectional area of the passage(s) preferably converges, but may diverge.

Figure 8:
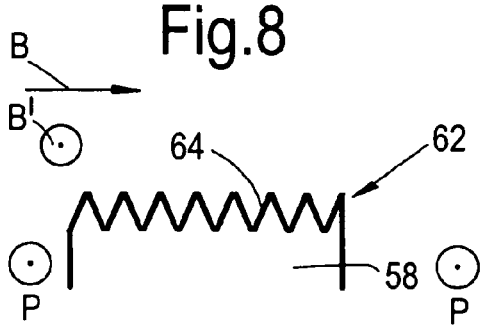
FIG. 8 is a view along section PP in FIG. 5c.
Figure 9:
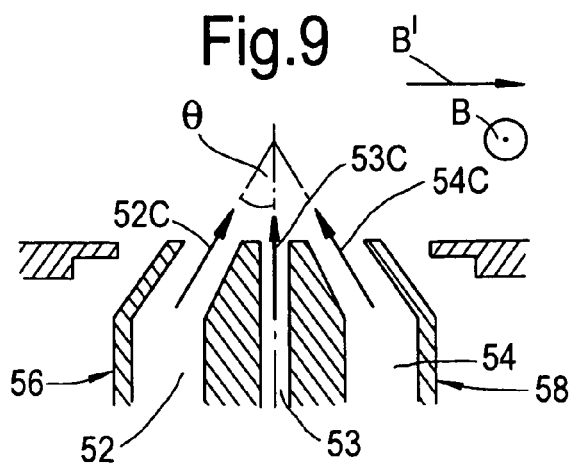
FIG. 9 is an alternative embodiment of that shown in FIG. 5c.

FIG. 8 is a view on arrow P in FIG. 5c and shows an outlet edge 62 of the passage wall 58. This outlet edge 62, which may be applied to any of the above embodiments, comprises a serrated profile. As shown the serrations 64 are generally triangular in shape. Small vortices are created, which spill off the sides of each serration 64. The vortices draw in the bypass flow B thereby increasing mixing with the plume 60. Alternatively, the serrated profile 64 may be formed from a series of shapes from the group comprising rectangles, trapezoids, rhomboids, and semi-circles.

Various embodiments may be made without departing from the scope of the invention. For example, in FIG. 9, the divider 61 may define a third passage 53 between passages 52 and 54. Passage 53 is generally radially aligned and passages 52, 54 are angled or curved to direct their gas flows 52C, 54C into the gas flow 53C issuing from passage 53.

The angle θ between at least two of the gas flows 52C, 53C, 54C should be at least 5 degrees and preferably around 20 degrees, but may be up to 60 degrees. The angle θ will be dependent on the mass flow rate through each of the passages, which need not be the same, and the orientation of the slots relative to the bypass flow B.

The angle θ between at least two of the gas flows 52C, 53C, 54C should be limited to prevent the hot gases from being forced downwards against the radially inner wall 27, which is usually a relatively low temperature resistant material. However, angles greater than 40 degrees may be used where the radially inner wall 27 is fabricated from a high temperature resistant material such as a metal.

In FIG. 5c the divider 61 comprises a tapering portion 65 ending in a relatively sharp edge 66. This sharp edge ensures there is minimal separation and reverse flow around the edge where the two gas streams meet. In FIG. 6, the edge 66 of the divider 61 is rounded to help turn the flows towards each other, however, in certain circumstances this may cause the flow separation radially outward of the edge 66 reducing efficiency of the outlet.

Figure 10:
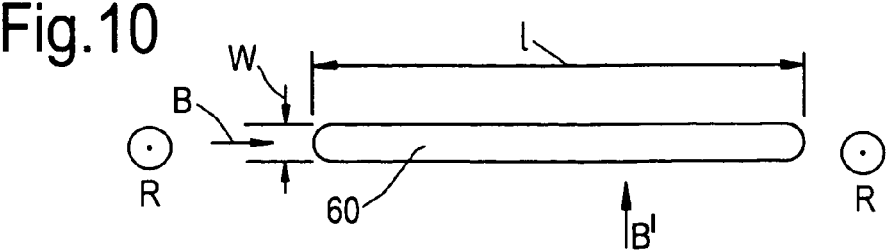
FIG. 10 is a section R-R on FIG. 5b.

The term 'high aspect ratio' refers to the cross-sectional area of the plume 60 as shown in FIG. 10. The configurations of the diffuser 50 cause the plume 60 to have a high aspect ratio where l>w. It is preferable for the aspect ratio to be as high as possible to improve mixing with the bypass flow. It is preferable that the high aspect ratio is in the order of 5:1 to 20:1

I claim:

1. A gas turbine engine comprising:
an airflow duct;
a compressor; and
a bleed valve arranged to bleed air from the compressor into the airflow duct;
the bleed valve includes
a diffuser having opposing walls and a divider located between the opposing walls which define at least two separate passages through which the bleed air flows into the airflow duct, wherein
the at least two separate passages are positioned at an angle towards each other, in a direction of the bleed air flow, to form a high aspect ratio plume.

2. The gas turbine engine as claimed in claim 1 wherein the angle is at least 5 degrees.

3. The gas turbine engine as claimed in claim 1 wherein the angle is up to 60 degrees.

4. The gas turbine engine as claimed in claim 1 wherein the angle is about 20 degrees.

5. The gas turbine engine as claimed in claim 1 wherein the at least two separate passages each terminate in an elongate slot.

6. The gas turbine engine as claimed in claim 5 wherein the elongate slots have a main axis which is orientated within 30 degrees of the direction of the bleed air flow.

7. The gas turbine engine as claimed in claim 6 wherein the main axis is approximately parallel to the direction of the bleed air flow.

8. The gas turbine engine as claimed in claim 5 wherein the elongate slots have a main axis which is approximately perpendicular to the direction of the bleed air flow.

9. The gas turbine engine as claimed in claim 1 wherein the opposing walls are curved towards each other to help turn two gas flows towards each other.

10. The gas turbine engine as claimed in claim 1 wherein the at least two separate passages are further defined by another pair of opposing walls.

11. The gas turbine engine as claimed in claim 10 wherein the another pair of opposing walls diverge from one another.

12. The gas turbine engine as claimed in claim 11 wherein an overall cross-sectional area of the passage(s) converges.

13. The gas turbine engine as claimed in claim 11 wherein an overall cross-sectional area of the passage(s) diverge.

14. The gas turbine engine as claimed in claim 1 wherein at least one of the opposing walls includes an outlet edge having a serrated profile for creating vortices in the plume.

15. The gas turbine engine as claimed in claim 14 wherein the serrated profile is formed from a series of shapes from the group including triangles, rectangles, trapezoids, rhomboids, and semi-circles.

16. The gas turbine engine as claimed in claim 14 wherein serrations are angled into the bleed air flow through a passage of the at least two separate passages.

17. The gas turbine engine as claimed in claim 1 wherein the divider defines a third passage.

18. The gas turbine engine as claimed in claim 1 wherein the divider includes a tapering portion.

19. The gas turbine engine as claimed in claim 1 wherein the divider includes a rounded edge.

* * * * *